(12) United States Patent
Doi et al.

(10) Patent No.: US 7,436,407 B2
(45) Date of Patent: Oct. 14, 2008

(54) TOPOLOGY DETERMINATION, DECOMPOSABLE SHAPE GENERATION, AND STRUCTURED MESH GENERATION

(75) Inventors: Jun Doi, Yokohama (JP); Keisuke Inoue, Sagamihara (JP); Atsushi Yamada, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 10/876,952

(22) Filed: Jun. 25, 2004

(65) Prior Publication Data
US 2005/0007368 A1     Jan. 13, 2005

(30) Foreign Application Priority Data
Jun. 27, 2003     (JP)     ............................. 2003-184979

(51) Int. Cl.
*G06T 15/00*     (2006.01)
(52) U.S. Cl. ..................................... 345/441
(58) Field of Classification Search ......... 345/419–421, 345/619–620, 441
See application file for complete search history.

(56) References Cited

U.S. PATENT DOCUMENTS 6,963,824 B1 * 11/2005 Davidson et al. ............... 703/2

7,196,705 B2 * 3/2007 Gallivan ..................... 345/440

FOREIGN PATENT DOCUMENTS

JP     PUPA 2001350802     12/2001

OTHER PUBLICATIONS

Japanese Publication No. 2004-21773 dated Jan. 22, 2004.
Takahashi et al. "A Three-Dimensional Automatic Mesh Generation System Using Shape Recognition Technique," 1993.
Taghavi, Reza, "Automatic Block Decomposition Using Fuzzy Logic Analysis," 9th International meshing Roundtable, New Orleans, Louisiana, Oct. 2000.
"An Approach for Eliminating Self-Intersecting Recognition Models for Hexahedral Mesh Generation," 2003, pp. 1-14.
Deerwester et al. "Indexing by Latent Semantic Analysis," 1990, pp. 1-34.

* cited by examiner

*Primary Examiner*—Phu K Nguyen
(74) *Attorney, Agent, or Firm*—Scully, Scott, Murphy & Presser, P.C.; Lisa M. Yamonaco

(57) ABSTRACT

Enables efficient correction of topological consistency of an input three-dimensional shape approximated in a spatial graph. Structured mesh generation systems of the present invention include: a topology determination apparatus for reading shape data from a shape data storage device to determine topological consistency and outputting data for solving a problem about topological consistency; a decomposable shape generation apparatus for reading the data outputted by the topology determination apparatus, changing a constraint condition of an integer programming problem solver to execute a shape correction process and outputting corrected shape data; and a structured mesh generation apparatus for reading the corrected shape data to generate a structured mesh.

10 Claims, 15 Drawing Sheets

(a)　　　　　　　　　　　(b)

(a) NON-DECOMPOSABLE SHAPE  (b) DECOMPOSABLE SHAPE

TOPOLOGY DETERMINATION, DECOMPOSABLE SHAPE GENERATION, AND STRUCTURED MESH GENERATION

FIELD OF THE INVENTION

The present invention relates to shape generation and shape recognition by a computer. It is more particularly related to topology determination decomposable shape generation, and structured mesh generation to enable efficient correction of topological consistency of an input three-dimensional shape approximated into a spatial graph.

BACKGROUND OF THE INVENTION

There is known an approach of generating an intermediate shape called a recognition model as an approach for generating a mesh for a given two-dimensional or three-dimensional shape. This method of creating a mesh via an intermediate shape is frequently used in various fields including mesh generation for analysis in a finite element method and surface rendering. In the case of a three-dimensional shape, a recognition model can be defined as a solid composed of only faces parallel to a coordinate plane and formed with multiple solids having vertexes with integer coordinate values, which are heaped so that an input three-dimensional model is imitated. Once this recognition model can be generated, it is possible, by decomposing the recognition model into unit polyhedrons in an integer space, to generate hexahedron unit elements, for example. By assigning the hexahedron unit elements inside an input model, a hexahedral mesh can be generated. FIG. 17 shows a recognition model (b) and a structured mesh (c) generated from a predetermined input three-dimensional shape (a) with a prior-art method.

The following is a listing of prior art document considered herein:

[1] Japanese Patent Application No. 2002-178068 by Yamada, Yoshizawa, Inoue and Doi.
[2] "Recognition Model Construction Approach without Self Interference for Generation of Hexahedral Mesh" by Yamada, Yoshizawa, Inoue and Doi; Collected Lecture Draft Papers for 2002 Annual Meeting of The Japan Society for Industrial and Applied Mathematics; September, 2002.
[3] "Development of Automatic Three-Dimensional Element Decomposition System Using Shape Recognition" by Hiroaki Takahashi et al.; Collected Papers of The Japan Society of Mechanical Engineers (Book A) 59(569); pp. 279-285, 1993.
[4] "Automatic Block Decomposition Using Fuzzy Logic Analysis" by Reza Taghavi, 9th International Meshing Roundtable, pp. 187-192, 2000.

In prior-art methods [1] and [2] for providing the structured mesh shown in FIG. 17, calculation is performed by solving an integer programming problem using an integer programming problem solver, using the imitation level of an input shape as an objective function and a condition causing no intersection as a constraint condition. In the prior-art methods, the constraint condition is dynamically changed by finding any violation position (intersection position) in iterative calculation and successively adding a constraint condition for resolving the violation. This process is repeated, and when all the violations of the constraint condition have been resolved, the iterative calculation ends and a recognition model without a violation is generated. In this case, the recognition model without an intersection is necessarily a decomposable shape. Accordingly, a mesh can be generated without a fail for a recognition model generated with the prior-art approaches.

It is a necessary condition for a non-decomposable shape to have an intersection of edges or faces, but having an intersection is not a sufficient condition for being a non-decomposable shape. In consideration of this point, the prior-art methods [1] and [2] provide a constraint of excluding intersections even when a recognition model is of a decomposable shape, and this may cause a problem that a generated mesh is deformed too much. Furthermore, the above-mentioned strict constraint condition is applied to all the calculations, and this may cause an inconvenience that predictability for output results to be generated by calculation required for outputting a suitable and allowable recognition model is reduced.

That is, if a recognition model is determined to be of a non-decomposable shape only because it has any intersection, it is a too strict condition for generation of a recognition model that is always decomposable. Among actual multidimensional shapes, there are shapes in which there is an intersection but it is allowable.

In addition to the methods described above, the documents [3] and [4] also disclose a method for generating a structured mesh via a recognition model of an input three-dimensional shape. However, the prior-art methods in the documents [3] and [4] below are not sufficient from the viewpoint of secure generation of a decomposable recognition model.

SUMMARY OF THE INVENTION

Therefore, in a first aspect of the present invention, there is provided a topology determination apparatus for executing a "non-decomposable position identifying process" for a shape including a topological consistency problem as input to output data of causal intersection positions, in a first configuration of the present invention. The topology determination apparatus further detects intersection positions causing non-decomposability (hereinafter referred to as "causal intersection positions" in the present invention) to identify the intersection positions as intersection pairs generating the causal intersection positions. The data of the causal intersection pairs is output data.

In a second aspect of the present invention, there is provided a "decomposable shape generation apparatus" for using the shape generated by a shape correction operation and the data of causal intersection pairs as input data to generate corrected shape data in which a causal intersection has been selectively eliminated and updating the shape data before the processing with the corrected shape data. The decomposable shape generation apparatus refers to a causal intersection list to dynamically change a constraint condition for a causal intersection position that causes non-decomposability. After that, the decomposable shape generation apparatus moves a shape element in the vicinity of the causal intersection position being processed until the causal intersection position is completely eliminated, and outputs corrected shape data corresponding to a decomposable shape.

In a third aspect of the present invention, there is provided a "structured mesh generation apparatus" for generating a structured mesh decomposed into polyhedron unit elements with the corrected shape data as input. The structured mesh generation apparatus of the present invention generates a mesh with unit elements for a recognition model provided by the corrected shape data and outputs structured mesh data.

BRIEF DESCRIPTION OF THE DRAWINGS

These, and further, aspects, advantages, and features of the invention will be more apparent from the following detailed description of a preferred embodiment and the appended drawings wherein.

DESCRIPTION OF SYMBOLS

Figure 1:
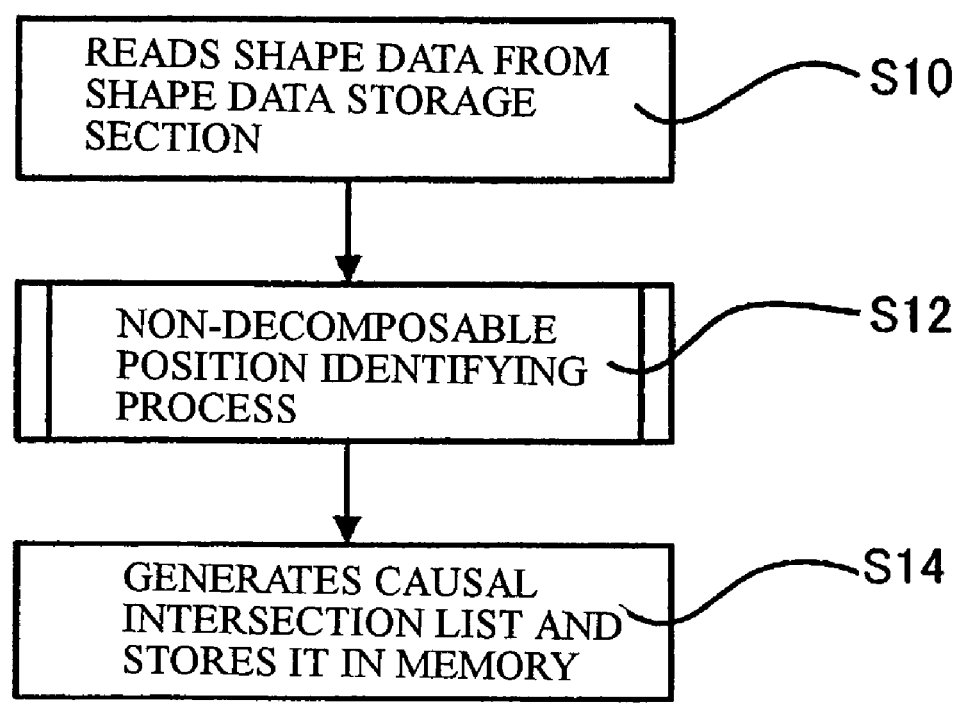
FIG. 1 is a flowchart showing a schematic process of a topology determination method to be executed in a topology determination apparatus of the present invention.

10 . . . Shape data storage section
12 . . . Computer
14 . . . Display device
16 . . . CPU
18 . . . Memory
20 . . . Input/output control section
22 . . . Internal bus
24 . . . Network interface controller
26 . . . Network
28 . . . Storage device
30 . . . Input device
32 . . . Topology determination apparatus
34 . . . Decomposable shape generation apparatus
36 . . . Structured mesh generation apparatus

DETAILED DESCRIPTION OF THE INVENTION

The present invention provides methods, systems and apparatus to enable efficient correction of topological consistency of an input three-dimensional shape approximated in a spatial graph. In the present invention, a shape which is generated by connecting a plurality of generally square or rectangular shapes (cubes or rectangular solids in the case of three dimension) (shape connection operation) is referred to as a decomposable shape, the definition of which will be described in detail later. It is a necessary condition for a non-decomposable shape to have an intersection of edges or faces, but having an intersection is not a sufficient condition for being a non-decomposable shape. In consideration of this point, the prior-art methods [1] and [2] provide a constraint of excluding intersections even when a recognition model is of a decomposable shape, and this may cause a problem that a generated mesh is deformed too much. Furthermore, the above-mentioned strict constraint condition is applied to all the calculations, and this may cause an inconvenience that predictability for output results to be generated by calculation required for outputting a suitable and allowable recognition model is reduced.

That is, if a recognition model is determined to be of a non-decomposable shape only because it has any intersection, it is a too strict condition for generation of a recognition model that is always decomposable. Among actual multidimensional shapes, there are shapes in which there is an intersection but it is allowable.

Figure 18:
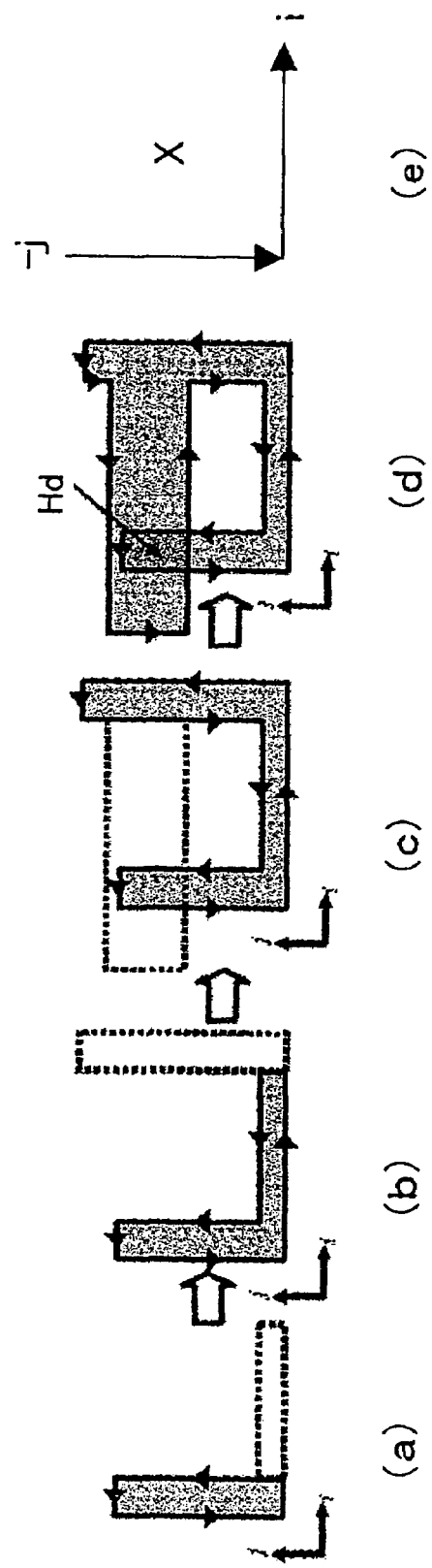
FIG. 18 shows how an edge changes due to an operation for generating a recognition model of an input shape.

Some specific problems which may be caused in the prior-art recognition model generation approaches will be now described below using two-dimensional shapes with reference to figures. FIG. 18 supplementarily describes the definition of a decomposable shape. As shown in FIG. 18(*a*), there are prepared multiple rectangular shapes formed by four edges parallel to the i and j coordinate axes. First, two rectangular shapes among them are connected at an edge, and then, a different rectangular shape is further connected to the generated shape at an edge. This operation is repeated. Through the operations, there is gradually generated a shape which is formed only by edges parallel to the i and j coordinate axes and formed as a closed loop, as shown in (b), (c) and (d) in that order. The sequence of operations is referred to as a "shape connection operation" in the present invention. A shape generated through this shape connection operation is referred to as a "decomposable shape" in the present invention. When a direction is given to the closed loop, the left side along the progress in the direction is assumed to be the inside of the loop. In FIG. 18 (*e*), the inside area along the progress direction described above in the present invention is indicated by a symbol "X". In the example shown in FIG. 18, the shape connection operation is repeated four times, and eventually, a decomposable shape (d) is generated.

In this case, any point included in any of the rectangular shape elements exists inside the two-dimensional shape. The shape shown in FIG. 18 has an overlapped area Hd, and there are such internal points that are included in multiple rectangular shapes at the same time. Such shapes are found among a lot of shapes and are not special. At the corner of the overlapped area as shown in FIG. 18, there exists an intersection of edges. The same direction as that specified for the loop is given to each edge forming the loop. The direction of edges can be classified into four kinds: 1) the direction of i increasing; 2) the direction of i decreasing; 3) the direction of j increasing; and 4) the direction of j decreasing, which are identified as labels +I, −I, +J and −J, respectively.

Figure 19:
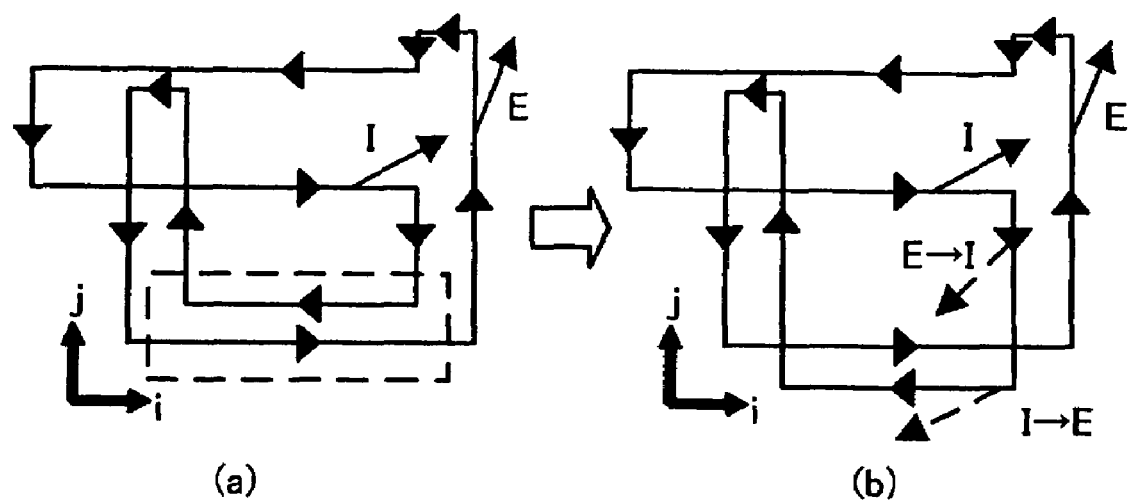
FIG. 19 geometrically shows an operation referred to as a "shape correction operation" in accordance with the present invention.

For a decomposable shape, by repeating an operation of moving an edge in the normal direction within such a range that the label of any edge does not change (that is, a range in which an +I edge does not change into an −I edge, for example), there is generated a two-dimensional shape exhibiting a different geometry. This situation is shown in FIG. 19. In FIG. 19, FIG. 19($a$) shows a decomposable shape, and FIG. 19($b$) shows a non-decomposable shape. The sequence of operations shown in FIG. 19 shows a geometric meaning of an operation referred to as a "shape correction operation". In the present invention, the sequence of operations described in the particular embodiment shown in FIG. 19 is referred to as a "shape deformation operation". This shape correction operation graphically illustrates processes to be performed in a process for solving an integer programming problem under a predetermined objective function and a predetermined constraint condition. Compared to the shape shown in FIG. 19($a$), the shape generated by the shape correction operation has the same number of edges and the label of each edge is the same, but the coordinate values of the vertexes are different as shown in FIG. 19($b$). A specific inconvenience is that, among shapes generated by the shape correction operation, there is also provided a shape that should never be generated by the shape correction operation. In the present invention, the shape is referred to as a "non-decomposable shape".

Additional description will be given using FIG. 19. In the decomposable shape shown in FIG. 19($a$), any point recognized to exist at a position facing toward the inside of the loop is always in on the inner side even if the processing is moved along the loop. However, in the non-decomposable shape shown in FIG. 19($b$), which is provided by the shape correction operation as shown by the arrows I and E, the direction of an arrow I, which points at the inner side relative to the progress direction, points at the outer side (I→E) as indicated by the broken arrow in FIG. 19 when the processing follows the edge in the same direction and reaches the lowest side loop, that is, reversal is caused. The same goes for the arrow E, and the arrow E is reversed (E→I) as indicated by a broken arrow. That is, the shape shown in FIG. 19($b$) includes a loop where inner-side and outer-side marks specified by the vectors specified to be in the same direction are reversed. Thus, the shape is a shape which cannot be constructed even if the shape connection operation shown in FIG. 18 is repeated and which includes topological inconsistency for performing a processing of automatically generating a structured mesh.

Although, the description has been given using a two-dimensional shape, the same is true for a three-dimensional shape. In this case, the operation of connecting multiple rectangular solids is called a "shape connection operation", and the sequence of operations for moving a face constituting the generated three-dimensional shape (decomposable shape) in the normal direction is called a "shape correction operation". Then, in the three-dimensional shape to be generated by the shape correction operation, there exists a shape which cannot be newly generated by the shape connection operation (non-decomposable shape).

Therefore, it has been required to make it possible to efficiently create a recognition model and a structured mesh without unsuitably eliminating intersections while certainly generating a recognition model. It has also been required to detect a shape which cannot be decomposed into rectangular solids, the shape being generated due to an operation of moving a shape element of a decomposable shape, which is specifically defined as an edge in the case of a two-dimensional shape and as a face or an edge and a face in the case of a three-dimensional shape, in the normal direction (shape correction operation). Furthermore, it is has been required to efficiently generate a structured mesh by identifying positions considered to be non-decomposable in the shape obtained by the shape correction operation. When performing correction, it has been required to efficiently generate a decomposable shape by applying the shape correction operation to data localized at the positions considered to be non-decomposable to perform shape correction rather than correcting the entire spatial graph.

Furthermore, it has been required to determine a recognition model enabling generation of a structured mesh without inconsistency and generate a structured mesh for the recognition model, after applying a shape correction operation required for correcting the geometric shape of a recognition model into a decomposable shape.

There are included multiple intersections in a shape generated by a shape correction operation. The shape cannot be decomposed due to some of the intersections. Conversely, the other intersections do not affect decomposability. Therefore, such intersections that will not cause a problem are sequentially deleted as pairs from the set of all the intersections, and the remaining intersection pairs are identified to be intersection pairs that are the cause of non-decomposability.

The shape is corrected by applying a shape correction operation in a manner that the intersections identified by the method are excluded, and a decomposable shape which is the most approximate to the original shape is determined. This is achieved by dynamically taking in a constraint condition for eliminating the identified intersection pair and solving an integer programming problem with the approximation to the original shape as an objective function.

A recognition model used for generation of a mesh has to be of a decomposable shape. Accordingly, after a decomposable recognition model is determined by the above-mentioned means, the recognition model is decomposed into mesh elements to generate a mesh.

More specifically, according to an example of the present invention, there is provided a topology determination apparatus for executing a "non-decomposable position identifying process" for a shape including a topological consistency problem as input to output data of causal intersection positions, in a first configuration of the present invention. The topology determination apparatus further detects intersection positions causing non-decomposability (hereinafter referred to as "causal intersection positions" in the present invention) to identify the intersection positions as intersection pairs generating the causal intersection positions. The data of the causal intersection pairs is output data.

In a second configuration of the present invention, there is provided a "decomposable shape generation apparatus" for using the shape generated by a shape correction operation and the data of causal intersection pairs as input data to generate corrected shape data in which a causal intersection has been selectively eliminated and updating the shape data before the processing with the corrected shape data. The decomposable shape generation apparatus refers to a causal intersection list to dynamically change a constraint condition for a causal intersection position that causes non-decomposability. After that, the decomposable shape generation apparatus moves a shape element in the vicinity of the causal intersection position being processed until the causal intersection position is completely eliminated, and outputs corrected shape data corresponding to a decomposable shape.

In a third configuration of the present invention, there is provided a "structured mesh generation apparatus" for generating a structured mesh decomposed into polyhedron unit elements with the corrected shape data as input. The structured mesh generation apparatus of the present invention generates a mesh with unit elements for a recognition model provided by the corrected shape data and outputs structured mesh data.

That is, according to the present invention, there is also provided a topology determination apparatus for determining topological consistency of shape data that provides a spatial graph of an input shape; the apparatus comprising:

a shape data storage device for storing the shape data;

means for reading the shape data from the shape data storage device, calculating positions of intersections of shape elements, generating pairs of the calculated intersection positions to create a causal intersection list and storing the causal intersection list in a memory;

means for selecting an intersection pair from the causal intersection list and determining topological consistency of the shape element between the selected pair of intersections;

means for registering the selected intersection pair as a causal intersection pair, in response to the determination of the topological consistency; and means for causing the causal intersection pair to be identified in the causal intersection list, in response to the registration.

According to the present invention, the means for determining topological consistency can comprise means for listing the number of intersections that exist in the shape element coupling the selected pair of intersections. According to the present invention, the means for causing the causal intersection pair to be identified in the causal intersection list can comprise means for deleting intersection pairs other than the causal intersection pair from the causal intersection list or for inserting an identifier indicating that the causal intersection is a causal intersection pair. According to the present invention, the means for determining topological consistency can comprise means for determining the selected intersection pair to be a causal intersection pair with the use of the parity of the number of the intersections.

According to the present invention, there is provided a decomposable shape generation apparatus for determining topological consistency of shape data that provides a spatial graph of an input shape and correcting the shape data so that it can be decomposed; the apparatus comprising:

a topology determination apparatus according to any of the above descriptions;

a storage device for storing a constraint condition and an objective function for an integer programming problem;

means for referring to a causal intersection list provided by the topology determination apparatus to read a causal intersection pair;

means for reading shape data from a shape data storage device to specify a shape element that provides the causal intersection pair;

shape correction means for reading the constraint condition for eliminating the intersection of the causal intersection pair from the storage device and numerically calculating the integer programming problem to correct the shape data; and means for updating the shape data including the causal intersection pair with corrected shape data obtained as a result of the numerical calculation and storing the updated shape data.

Furthermore, according to the present invention there is provided a structured mesh generation apparatus, comprising:

the decomposable shape generation apparatus according to any of the above descriptions;

means for reading shape data including no causal intersection pair, that is provided by the decomposable shape generation apparatus, from a shape data storage device to generate structured mesh data using a two-dimensional shape or a polyhedron; and means for storing the generated structured mesh data in a storage device.

According to the present invention, there is also provided a method for causing a computer to function as a topology determination apparatus for determining topological consistency of shape data that provides a spatial graph of an input shape; the method causing the computer to execute steps of:

reading the shape data from a shape data storage device;

calculating intersection positions of shape elements of the read shape data, generating pairs of the calculated intersection positions to create a causal intersection list and storing the causal intersection list in a memory;

selecting an intersection pair from the causal intersection list and determining topological consistency of the shape element between the selected pair of intersections;

means for registering the selected intersection pair as a causal intersection pair, in response to the determination of the topological consistency; and means for causing the causal intersection pair to be identified in the causal intersection list, in response to the registration.

According to the present invention, the step of determining topological consistency can comprise a step of listing the number of intersections that exist in the shape element coupling the selected pair of intersections and storing the list in a memory. According to the present invention, the step of causing the causal intersection pair to be identified in the causal intersection list can execute a step of deleting intersection pairs other than the causal intersection pair from the causal intersection list or a step of inserting an identifier indicating that the causal intersection is a causal intersection pair. According to the present invention, the step of determining topological consistency can comprise a step of determining the selected intersection pair to be a causal intersection pair with the use of the parity of the number of the intersections.

According to the present invention, there is also provided a method for causing a computer to determine topological consistency of shape data that provides a spatial graph of an input shape to generate a decomposable shape; the method causing the computer to execute steps of:

reading the causal intersection list generated by the method according to any of the above descriptions to determine a causal intersection pair;

reading a constraint condition and an objective function for an integer programming problem for eliminating causal intersection pairs included in the causal intersection list from the storage device;

reading shape data from a shape data storage device and specifying shape elements that provide the causal intersection pairs;

using the constraint condition and the objective function to numerically calculate the integer programming problem and correct the shape data; and updating the shape data including the causal intersection pairs with corrected shape data obtained as a result of the numerical calculation and storing the updated shape data.

According to the present invention, there is also provided a method for causing a computer to determine topological consistency of shape data that provides a spatial graph of an input shape to generate structured mesh data; the method causing the computer to execute steps of:
- a step of reading shape data including no causal intersections, that is provided by the method according to any of the above descriptions from the shape data storage device;
- generating structured mesh data using a two-dimensional shape or a polyhedron, from the outer edge toward the inside of the read shape data; and
- storing the generated structured mesh data in a storage device.

According to the present invention, there is also provided a computer-executable program for causing a computer to execute the method according to any of the above descriptions.

According to the present invention, there is also provided a structured mesh generation system for determining topological consistency of shape data that provides a spatial graph of an input shape to generate a structured mesh, the structured mesh generation system comprising:
- a topology determination apparatus for reading shape data from a shape data storage device to determine topological consistency and outputting data for resolving topological inconsistency;
- a decomposable shape generation apparatus for reading the data outputted by the topology determination apparatus, changing a constraint condition of an integer programming problem solver, and executing a shape correction process to output corrected shape data; and
- a structured mesh generation apparatus for reading the corrected shape data to generate a structured mesh.

FIG. 1 is a flowchart showing a schematic process of a topology determination method to be executed in a topology determination apparatus of the present invention. The topological condition to be determined in the present invention means topological consistency, which is referred to in the expression, for example: "The direction, which was recognized to be headed toward the inside, has been headed toward the outside when the process progresses from one end and reaches the other end." A topology determination method of the present invention will be described using FIG. 1. At step S10, at least two-dimensional or three-dimensional spatial-graph shape data is acquired from a shape data storage device consisting of a hard disk, an EEPROM, or a flash memory.

The shape data to be read is data approximated to an input two-dimensional or three-dimensional shape as a spatial graph defined by the vertex coordinates, edges connecting vertexes, edges, faces and the like of the input shape. The shape data includes vertex data, edge data, the loop direction, face data and the like, and is configured as data enabling reproduction of the two-dimensional or three-dimensional shape. At step S12, a non-decomposable position identifying process is executed to identify a causal intersection position, specifically, an intersection pair that satisfies a condition for a causal intersection. The non-decomposable position identifying process in step S12 is executed with the use of identification values of two intersections and an edge row or a face row which couples the intersections in a predetermined direction as input data.

At step S14, a causal intersection list is created using the data of the identified causal intersection pair, in a format which enables the causal intersection pair to be identified in the causal intersection list including possible intersection pairs, and the causal intersection list is stored in a memory.

The data included in the causal intersection list is referred to by a decomposable shape generation apparatus to be described later and used for controlling reading of a shape correction position and a control condition.

Description will be made on the non-decomposable position identifying process at step S12 to be executed by a computer in the topology determination method of the present invention. The processing function includes a processing function of identifying an intersection that causes non-decomposability from multiple intersections to identify a causal intersection pair providing the causal intersection. For convenience of description, input shape data is assumed to include any zero (0) or more intersections. Such an intersection can be regarded as an intersection point at which edges cross in the case of two dimensions, and calculated as an intersection of a line segment and a face segment or of face segments in the case of a three-dimension shape. For facilitating essential understanding of the present invention, description will be made mainly using a two-dimensional shape. However, the same is true on the case of a three-dimensional shape, where the relation of edge to edge is replaced with the relation of edge segment to face segment, and an edge row is handled as an edge row or a face segment row.

Figure 2:
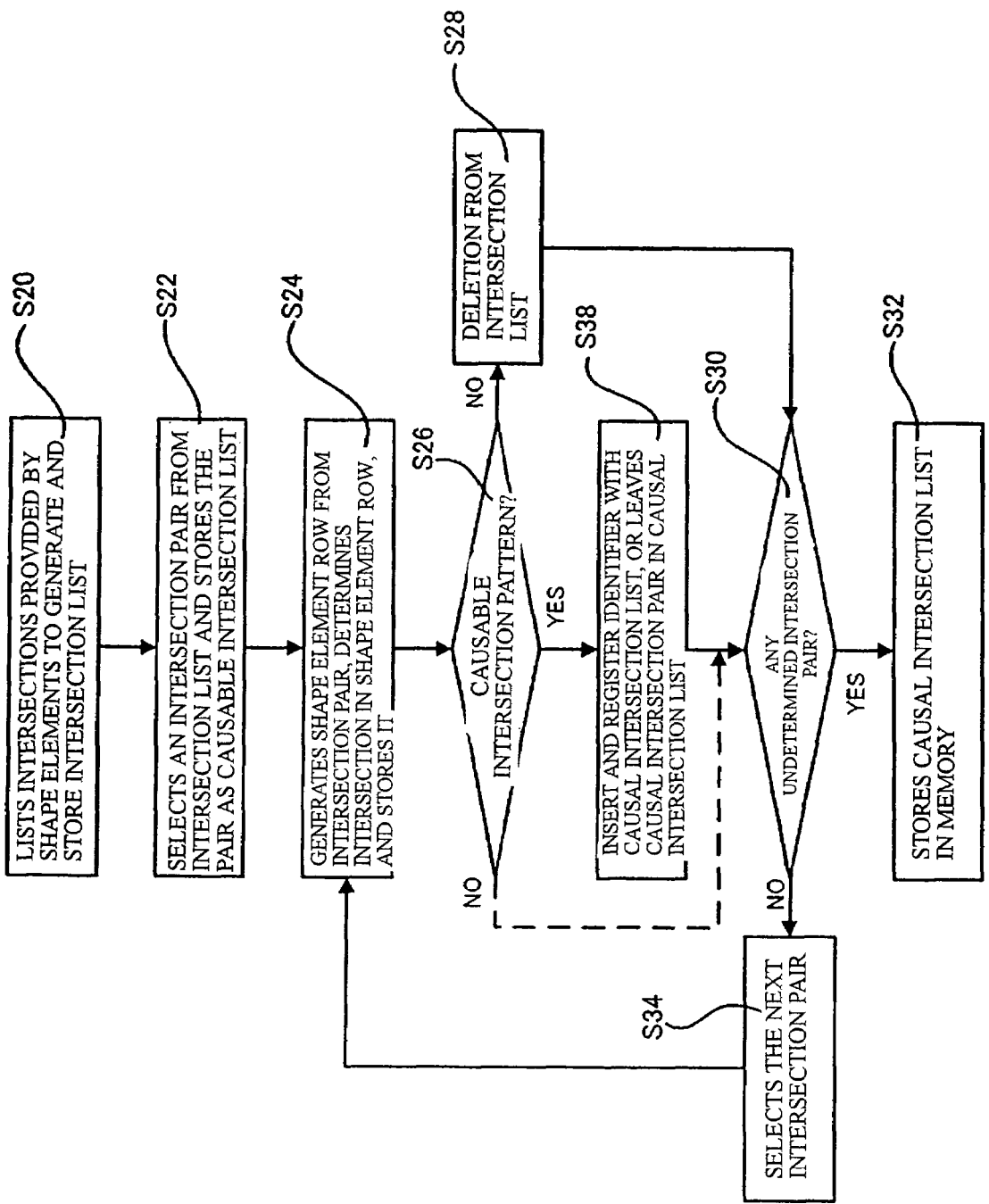
FIG. 2 is a detailed flowchart of the non-decomposable position identifying process of the present invention shown at step S12.

FIG. 2 shows a detailed flowchart of the non-decomposable position identifying process of the present invention shown at step S12. In the process shown in FIG. 2, the above-mentioned intersection identification values are acquired and stored in a memory to generate an intersection list at step S20. In a more specific embodiment, if there are n intersections, the intersection list can be generated, for example, as $\{V_A, V_B, \ldots, V_{n-1}, V_n\}$, where the intersection identification values are indicated as $V_A$ to $V_n$. At step S22, two pairs which can possibly cross are selected from the generated intersection list, and the pairs are stored in a memory as $\{V_A, V_B\}$, for example. At step S24, $V_A$, for example, is selected as one end, and shape elements such as edges and faces coupling intersection pairs are listed. After that, an edge row which does not pass $V_A$ and $V_B$ on the way is retrieved with $V_B$ as the other end, listed as an edge row $E_0$ and stored in a memory.

Figure 3:
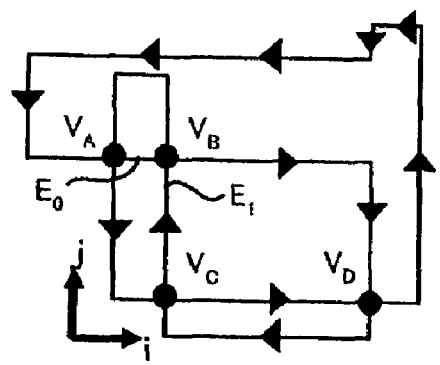
FIG. 3 shows an embodiment of the edge $E_0$ and the edge $E_1$.

By decomposing the edge intersecting with $E_0$ at right angles at $V_A$, and the edge intersecting $E_0$ at right angles at $V_B$, a closed loop representing a shape into two edge rows to define a second edge row $E_1$. The second edge row $E_1$ is identified as (Va, Vb, $E_1$), for example, and registered with a memory. FIG. 3 shows an embodiment of the edge row $E_0$ and the edge row $E_1$ identified by the process described above.

Figure 4:
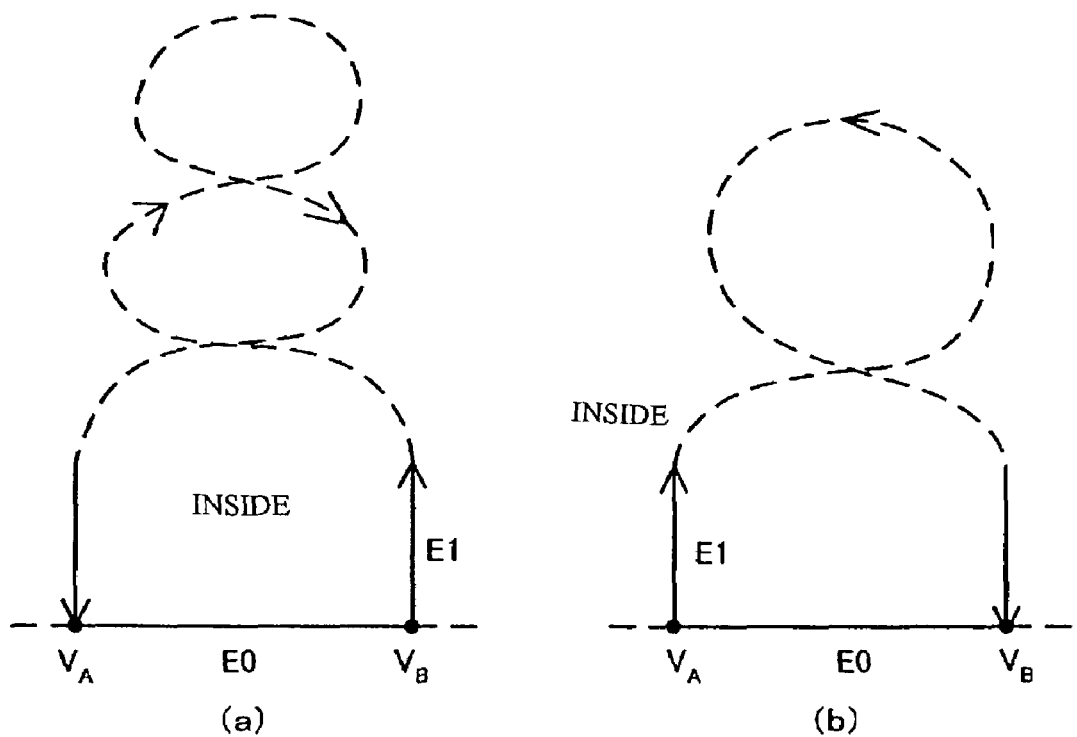
FIG. 4 graphically shows an embodiment of the determination performed at step S26.

At step S26, an intersection pattern of edges included in a generated edge row, for example, the edge row $E_1$ is determined. An intersection pattern can be determined based on whether or not any two edges selected from within the edge row $E_1$ include the same position coordinates. It can be also determined based on whether or not edges constituting the edge row $E_1$ are shape elements for the same intersection in the registered intersection list. FIG. 4 graphically shows an embodiment of an intersection pair that is not determined to be a causal intersection pair in the determination at step S26. FIG. 4 also shows the position of an area assumed to be the inside in a spatial graph.

In the present invention, in consideration of the direction of $E_1$ shown in FIG. 4, an intersection pattern which should not be immediately specified as a causal intersection pair can be assumed to have: (1) an even number of intersections of the edge rows if the inner side of the intersection pattern formed by $E_0$ and $E_1$ is the inner side of a shape to be generated, as shown in FIG. 4(a); and (2) one (an odd number of) intersection if the outer side of the intersection pattern formed by $E_0$ and $E_1$ is the inner side of a shape to be generated, as shown in FIG. 4(b). In the present invention, it has been found that the above-mentioned characteristic can be used for determination of consistency for inner/outer side determination in a spatial graph, and inclusiveness from the viewpoint of topology is determined by determining parity of the number of intersections of edge rows or face rows specified between a pair of intersections. By adopting this topology determination criterion, it is possible to eliminate an intersection when inconvenience occurs rather than eliminating all the intersections at a time.

Figure 5:
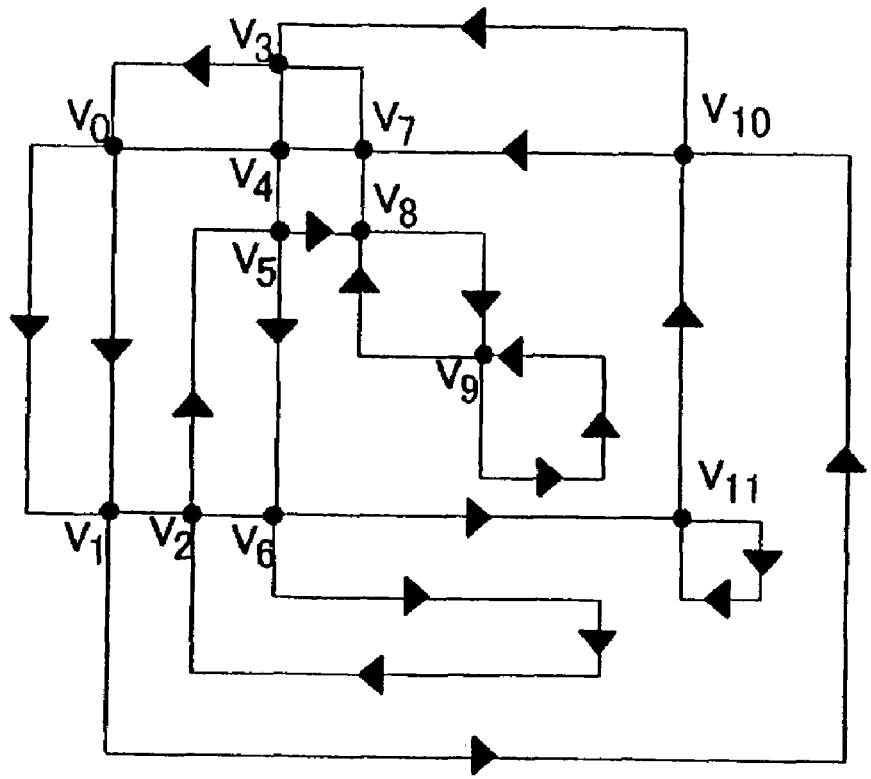
FIG. 5 shows another embodiment wherein a causal intersection pair is provided according to the present invention.

FIG. 5 shows another embodiment wherein causal intersection pairs are provided in the present invention. The shape in FIG. 5 is shown to have twelve intersections indicated by $V_0, \ldots, V_{11}$. Pairs other than causal intersection pairs, which are deletable from a list in the non-decomposable position identifying process, are $\{V_0, V_1\}$, $\{V_0, V_7\}$, $\{V_0, V_{10}\}$, $\{V_1, V_2\}$, $\{V_1, V_{11}\}$, $\{V_2, V_7\}$, $\{V_3, V_5\}$, $\{V_4, V_6\}$, $\{V_4, V_{10}\}$, $\{V_6, V_{11}\}$, and $\{V_{10}, V_{11}\}$. As for the intersections $V_8$ and $V_9$ shown in FIG. 5, the edge row starting from the $V_8$ loops back to the initial intersection, and therefore, either of the intersections $V_8$ and $V_9$ cannot be a pair with any of the intersections. As a result, an edge row or a face segment row cannot be defined, and intersection pairs including the intersections $V_8$ and $V_9$ are outputted as causal intersection pairs by the processing of the present invention in the non-decomposable position identifying process. Furthermore, in the present invention, it is also possible to extract common intersections from these pairs, put the causal intersection pairs together, and eventually leave it as a pair of $\{V_8, V_9\}$ in the causal intersection list.

There are listed up conditions for an intersection pair to be identified as a causal intersection pair in the present invention in Table 1. This list can be stored in a suitable storage area in a computer used in the present invention.

TABLE 1

| Inside/outside of E0, E1 | Inside/outside in spatial graph | Number of intersections of shape |
|---|---|---|
| Inside | Inside | Odd number |
| Outside | Inside | Even number |
| N/A | — | — |

Returning to FIG. 2 again, description will be made on a causal intersection position identifying process of the present invention. At the determination of an intersection pattern of an intersection performed at step S26, if it is determined that the intersection pair being processed is not a causal intersection (NO), then the process proceeds to step S28 and deletes the intersection pair being processed at that point of time from the causal intersection list. After the deletion, such intersection pairs that include the intersection determined at that point of time, for example $V_A$ or $V_B$ are also deleted from the causal intersection list. At step S30, it is then determined whether or not determination has been performed for all the registered intersection pairs, with the use of the number of deleted intersection pairs and the number of intersection pairs left in the causal intersection list, for example. If it is determined that the processing has been finished for all the intersection pairs (YES) at the determination at step S30, then the causal intersection list including only causal intersection pairs is stored in a memory at step S32, and the process ends. At step S30, if determination has not been completed for all the intersection pairs (NO), then the next intersection pair is read from the list at step S34, and the process returns to step S24. The process repeats until determination has been completed for all the intersection pairs.

If it is determined that the intersection pair being processed is determined to be a causal intersection (YES) at the determination performed at step S26, then processing shown by a broken line is executed to return the process to step S30, so that the process can be executed until all the causal intersection pairs are identified. In this case, when the process ends, there are left only causal intersection pairs in the causal intersection list. In another aspect of the present invention, when it is determined that the intersection pair being processed is a causal intersection pair (YES) at step S26, the process proceeds to step S38, where a processing for identifying the intersection pair being processed may be processed. For example, an identifier may be inserted before the causal intersection pair as $\{R, V_C, V_D\}$ so that it can be referred to in the succeeding processes. Furthermore, in another embodiment of the present invention, by setting an indication of a meaningful intersection, for example, an "undeletable flag" such as a letter "N", a meaningful intersection can be identified as $\{N, V_A, V_B\}$, instead of deleting a causal intersection pair at step S28.

Figure 6:
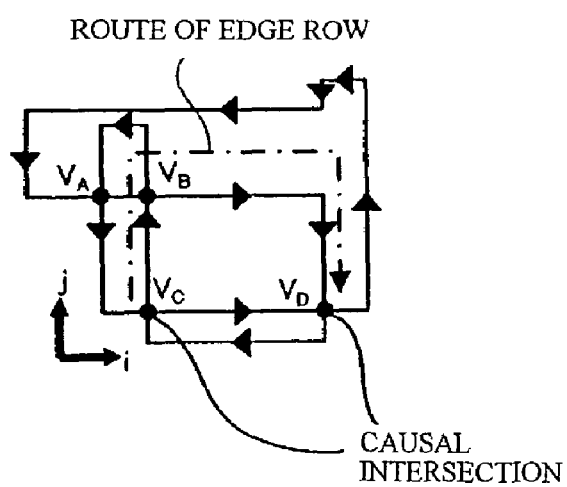
FIG. 6 graphically shows a causal intersection position identifying process of the present invention as is applied to an actual shape.

FIG. 6 graphically shows the causal intersection position identifying process of the present invention as it is applied to an actual shape. The shape data shown in FIG. 6 has four intersections $V_A$, $V_B$, $V_C$ and $V_D$. In the present invention, all these intersections are listed and stored in a memory as a causal intersection list of $[\{V_A, V_B\}, \{V_A, V_C\}, \{V_A, V_D\}, \{V_B, V_C\}, \{V_B, V_D\}, \{V_C, V_D\}]$. The pair $\{V_A, V_B\}$ is determined not to be a causal intersection and identified as deletable from the intersection list by the causal intersection position identifying process described above. The process then proceeds to determination for the remaining pairs and sequentially determines whether to delete $\{V_A, V_C\}$, $\{V_A, V_D\}$, $\{V_B, V_C\}$, $\{V_B, V_D\}$, and $\{V_C, V_D\}$ in that order. In the embodiment shown in FIG. 6, the process of the present invention determines the last pair $\{V_C, V_D\}$ to be a causal intersection pair, and therefore generates a causal intersection list, for example, as $\{V_C, V_D\}$ or $[\{V_A, V_B\}, \{V_A, V_C\}, \{V_A, V_D\}, \{V_B, V_C\}, \{V_B, V_D\}, \{R, V_C, V_D\}]$ to store the list in a memory.

Figure 7:
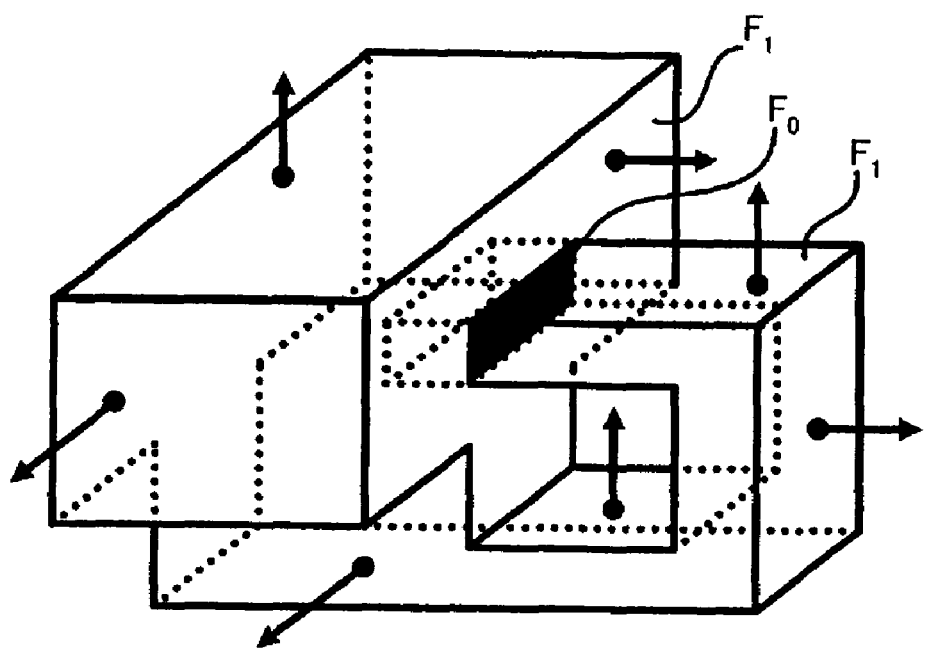
FIG. 7 shows an embodiment wherein a topology determination method of the present invention is applied to a three-dimensional shape.

FIG. 7 shows an embodiment wherein the topology determination method of the present invention is applied to a three-dimensional shape. In the case of the three-dimensional shape shown in FIG. 7, a line segment generated by intersection of faces is processed as an intersection. Specifically, dimensionally extending the determination on whether edges share the same position coordinates in the case of two dimensions, determination for an intersection is performed based on whether or not one face or edge shares position coordinates with another face, and an intersection list is then generated and stored in a memory. A causal intersection list is generated by listing all loops that are composed of only intersections, and the list is stored in a memory. One loop is then selected from the causal intersection list and represented by $F_0$. By dividing the face, which intersects with $F_0$ at right angles at the border of $F_0$, with the line of intersection, the shell representing the shape can be divided into two open polygon groups. One of the polygon groups is represented by $F_1$.

Figure 8:
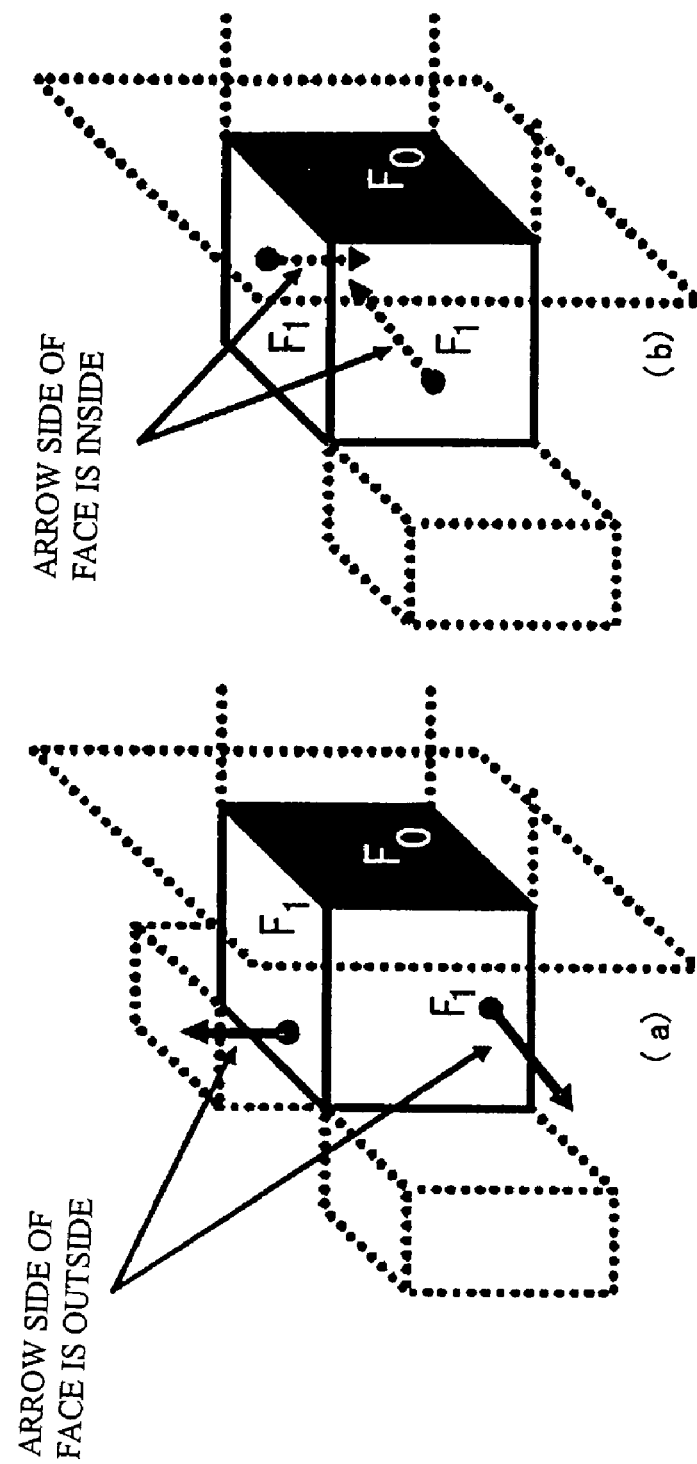
FIG. 8 shows intersection patterns of intersection between faces.

FIG. 8 shows intersection patterns for $F_0$ and $F_1$. FIGS. 8(a) and 8(b) show intersection patterns for which the direction (sides) of $F_1$ is taken into consideration. In either case of FIG. 8, if $F_1$ includes an even number of intersections which do not form a closed loop, then the intersections constituting $F_0$ are deleted from the list. After the deletion, if another loop includes an intersection constituting $F_1$, then the face loop is also deleted from the list. The operation of selecting another face loop and deleting it if it is deletable is repeated. When there is no deletable pair in the list, then this iteration operation ends. The intersection pairs included in a face loop, which remain on the list at this stage, are identified as causal intersection positions.

Figure 9:
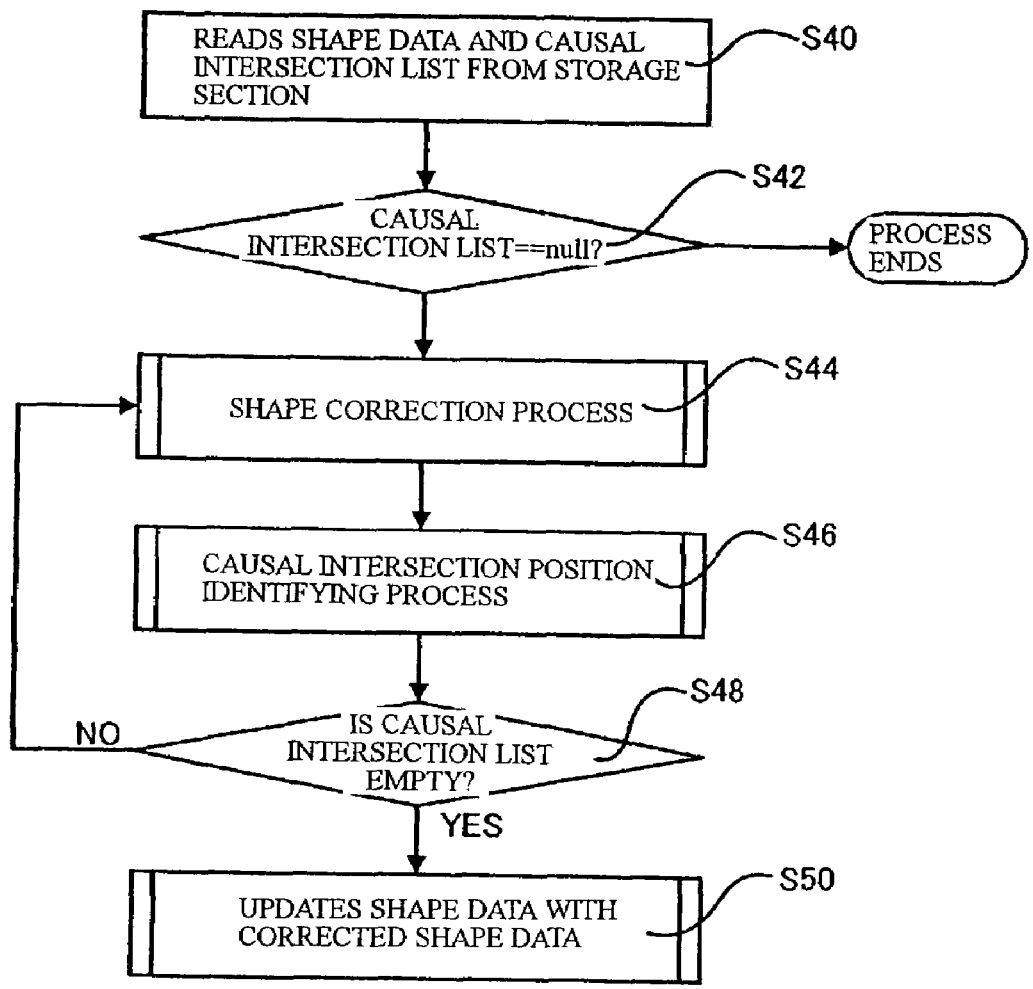
FIG. 9 shows a schematic flowchart of a process executed by a decomposable shape generation apparatus of the present invention.

FIG. 9 shows a schematic flowchart of a process executed by the decomposable shape generation apparatus of the present invention. In the decomposable shape generation process shown in FIG. 9, shape data is acquired from a storage section at step S40. At step S42, data is read from a causal intersection list and it is determined whether or not any causal intersection exists (causal intersection list=null). As a result of the determination at step S42, if there is no causal intersection pair (YES), it means that there is no causal intersection position in the shape data to be processed at the point of time. Accordingly, the process ends and waits for the next appropriate command. At the determination at step S42, if it is determined there is a causal intersection, then the process proceeds to step S44, where a shape correction process is executed.

The shape correction process performed at step S44 will be described below. Irrespective of whether or not there is included any causal intersection pair, the function of the shape correction process assumes shape data providing a spatial graph as input, and realizes a function of automatically deforming the input shape so that any causal intersection position can be eliminated therefrom. The shape correction process overwrites the shape data immediately before execution of the process with corrected shape data providing a decomposable shape to provide updated and corrected shape data. The shape correction process of the present invention iterates while calling the above-mentioned non-decomposable position identifying process, until there is found no causal intersection position in the list finally, as described later.

The methods described in the specification of Japanese Patent Application No. 2002-178068 assigned to the same assignee [1] and in "Recognition Model Construction Approach without Self Interference for Generation of Hexahedral Mesh" by Yamada, Yoshizawa, Inoue and Doi; Collected Lecture Draft Papers for 2002 Annual Meeting of The Japan Society for Industrial and Applied Mathematics; September, 2002 [2] can be used for essential processing of the shape correction process performed at step S44. To describe this schematically, the shape correction process assumes a condition of eliminating intersection positions as a constraint condition and executes a process for determining a solution for minimizing an objective function, which has been constructed with the use of a predetermined index, by using an integer programming problem. In the method disclosed in the above-mentioned patent application, all the positions where an intersection is generated are listed and an integer programming problem is solved with the condition that all the intersections should be eliminated as a constraint condition. By contrast, the present invention is different from the method in that a constraint condition that a causal intersection pair should be selectively eliminated is incorporated in response to detection of a causal intersection pair to execute the process, without applying the constraint condition of elimination to an intersection which is not a causal intersection.

Figure 10:
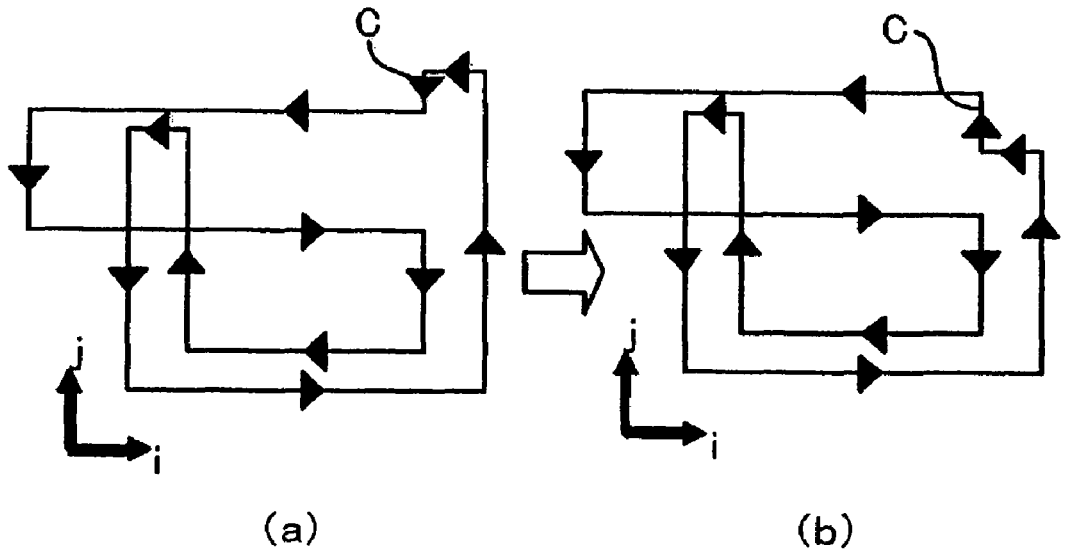
FIG. 10 shows an example of label reversal in the present invention, with the use of an actual shape.

An objective function to be used in the present invention may be an objective function that minimizes the sum of changes in length of edges, similarly to the specification of Published Unexamined Patent Application No. 2002-178068, for example. A constraint condition for the purpose of preventing label reversal is constructed. In the present invention, label reversal is assumed to mean that the direction of an edge in a loop is reversed due to the shape correction process. When label reversal is caused, there may be caused an inconvenience that the topology of a reproduced three-dimensional shape is reversed due to the reversed label. In FIG. 10, an example of label reversal is described with the use of an actual shape. FIG. 10(a) shows a shape generated from shape data before execution of the shape correction process, and FIG. 10(b) shows an embodiment of the shape correction process which causes label reversal.

Referring to FIGS. 10(a) and 10(b), it is shown that the direction of a ridgeline indicated by the symbol "C" in a loop is reversed between FIGS. 10(a) and 10(b). In the present invention, it is not necessary to use a shape correction process which takes label reversal into consideration in the case of handling an input shape which never causes the above-mentioned label reversal. However, in order to handle a more common general-purpose input shape in the present invention, it is desirable to perform shape correction which restricts label reversal. If the constraint condition for preventing label reversal is illustratively described using a condition for preventing reversal of the +I label edge starting at $V_0$ [$i_0$, $j_0$] and ending at $V_0$ [$i_1$, $j_0$] in the case of a two-dimensional shape, for example, it can be simply described as $i_0 < i_1$. The above-mentioned constraint condition for preventing label reversal can be introduced as a constraint condition applicable to all the vertexes and edges.

Figure 11:
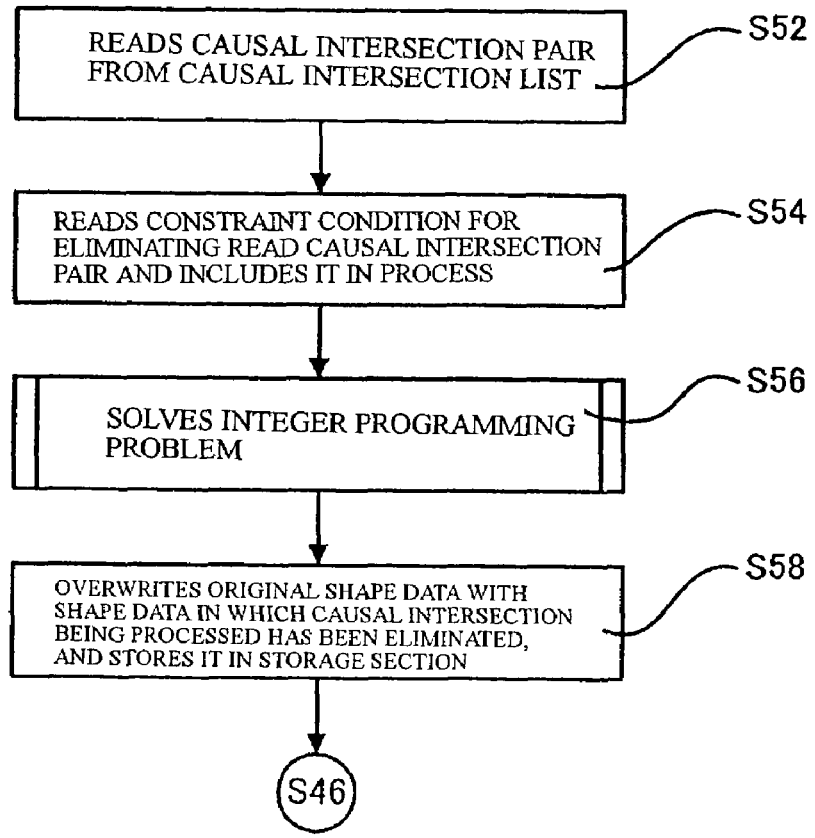
FIG. 11 describes a shape correction process of the present invention in detail.

The shape correction process of the present invention will be described in more detail with reference to FIG. 11. At step S52, a causal intersection pair is read from a causal intersection list stored by performing at least a causal intersection process. At step S54, a constraint condition for eliminating the corresponding causal intersection pair is introduced. To explain a specific embodiment of the constraint condition, elimination of a causal intersection pair can be performed by incorporating a conditional expression, in which a condition for preventing the +I label edge starting at $V_0$[$i_0$, $j_0$] and ending at $V_1$ [$i_1$, $j_0$] ($i_0 < i_1$) and the +J label edge starting at $V_A$ [$i_A$, $j_A$] and ending at $V_B$ [$i_A$, $i_B$] ($i_A < j_B$) from intersecting with each other is set as a constraint condition, into a processing routine. Specifically, the condition a given by the expression below is an example of a constraint condition.

$$i_0 - i_A > 0, \text{ or } i_A - i_1 > 0, \text{ or } j_A - j_0 > 0, \text{ or } j_0 - j_B > 0 \qquad \text{[Expression 1]}$$

In the case of a three-dimensional causal intersection, any equivalent condition for eliminating intersection of a line segment and a face segment can be used similarly.

The process then proceeds to step S56, where an integer programming problem is calculated, which is represented by a constructed objective function and a constraint condition to generate shape data in which the causal intersection being processed at that point of time has been eliminated. After that, at step S58, the shape correction process of the present invention overwrites and updates the shape data in a shape data storage section with shape data in which at least targeted causal intersection has been eliminated. The process then passes the shape data to step S46 of the decomposable shape generation process in FIG. 9 and executes a processing for causing the causal intersection identifying process to be repeated again.

With reference to FIG. 9 again, description will be made on the iteration from steps S44 to S48 of the decomposable shape generation process of the present invention. Using the corrected shape data provided by the shape correction process at step S44, the causal intersection identifying process is executed again. At the same time, if there is any other excluded causal intersection, the intersection pair corresponding thereto is also deleted from the causal intersection list. If a new intersection pair is registered as a causal intersection pair, or if there is found any remaining causal intersection pair (NO), then the decomposable shape generation process of the present invention returns to step S44 and executes the shape correction process. After that, at step S46, the non-decomposable position identifying process is called and it is checked whether or not the intersection is a causal intersection. This is repeated until the causal intersection list is empty, and the shape correction process and the causal intersection position identifying process are repeatedly executed. At step S48, if the causal intersection list is empty (YES), then the process proceeds to step S50, where corrected shape data without a causal intersection position is outputted eventually, and data in the shape data storage device is updated.

Figure 12:
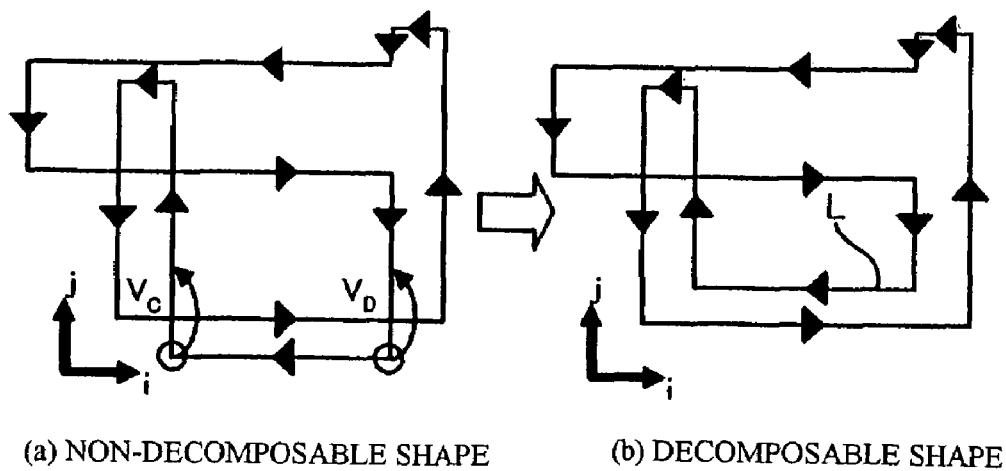
FIG. 12 shows an embodiment of a decomposable shape generated from a non-decomposable shape by a decomposable shape generation process of the present invention.

FIG. 12 shows an embodiment of a decomposable shape generated from a non-decomposable shape by the decomposable shape generation process of the present invention. FIG. 12(a) shows an embodiment of a non-decomposable shape having a causal intersection pair $\{V_C, V_D\}$. FIG. 12(b) shows an embodiment wherein the causal intersection pair $\{V_C, V_D\}$ causing a causal intersection has been eliminated by incorporating a constraint condition to change the position coordinates of the vertexes of the edge L, which are surrounded by a circle. In the present invention, the process for incorporating the constraint condition can be read as an external function, branched as a subroutine, or implemented as a process for passing data to an object described therefor, in response to detection of a causal intersection pair.

As apparent from the embodiment shown in FIG. 12, a process for identifying causal intersection positions is adopted in the present invention, so that shape correction can be performed only using parameters for at least several edges forming causal intersections. Accordingly, processing time required for a processor to perform the decomposable shape generation process can be significantly reduced, and burden on computer resources and on a user can be reduced. Furthermore, since significant shape change is not caused, it is possible to provide scalability, which means job completion predictability in computing.

Figure 13:
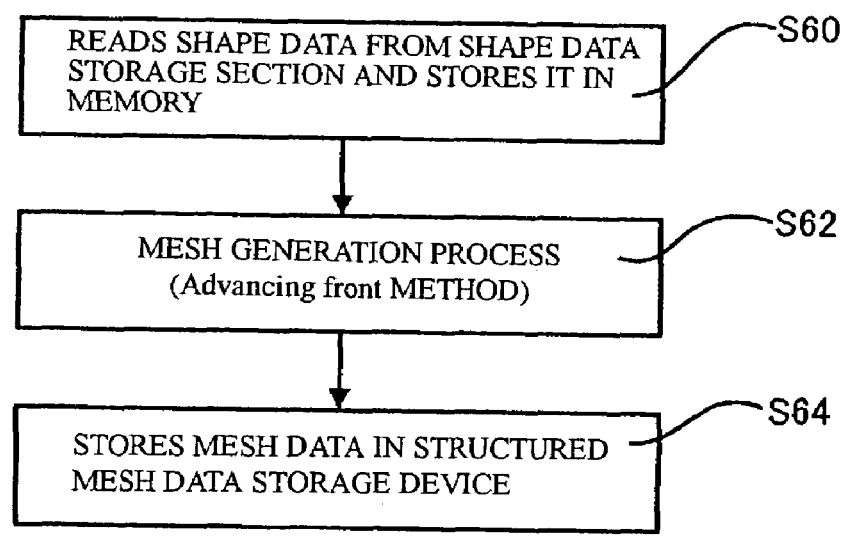
FIG. 13 shows a schematic flowchart of a structured mesh generation process of the present invention.

FIG. 13 shows a schematic flowchart of a structured mesh generation process of the present invention. In the structured mesh generation process of the present invention, shape data is read from the storage section and stored in an appropriate storage area at step S60. Since the shape data read at this stage does not have any causal intersection, the process immediately proceeds to step S62, where a process for generating a quadrangle or hexahedral mesh is executed. Though various methods can be used for mesh generation performed at step S62, a structured mesh can be generated with the advancing front method in a particular embodiment of the present invention. In the advancing front method, mesh elements are sequentially created in layers from the border of a recognition model, which is a projection of shape data into an actual space, toward the inside.

In this case, various shapes can be used for creation of a structured mesh, and a unit square, a rectangle and a polygon can be used in the case of two-dimensional representation, and any shape, such as a unit cube, a unit rectangular solid and a polyhedron, can be used as required in the case of three-dimensional representation. Especially, in the present invention, it is preferable to use a unit square or a regular hexahedron though it is not intended to exclude other shapes. The structured mesh generation process at step S62 is stopped when all the inside has been filled with unit shapes. At step S64, structured mesh data is outputted to a storage device such as a hard disk, and the process ends.

Figure 14:
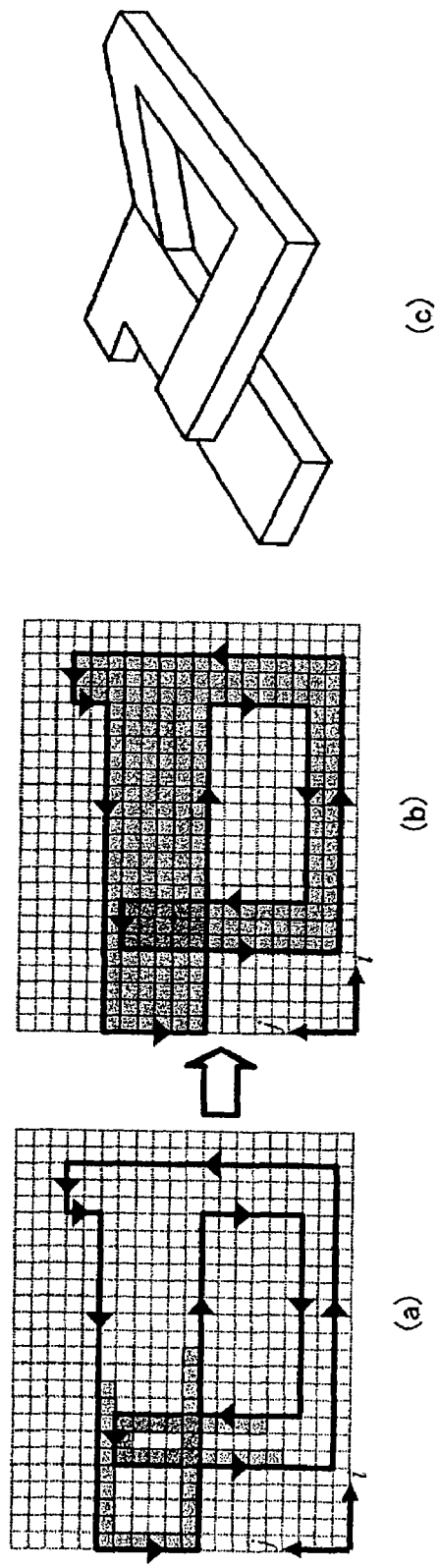
FIG. 14 shows an embodiment of a structured mesh generated with the advancing front method in accordance with the present invention.

FIG. 14 shows an embodiment of a structured mesh generated with the advancing front method in accordance with the present invention. FIG. 14(a) shows an embodiment immediately after generation of a mesh is started. FIG. 14(b) shows an embodiment when generation of a mesh has been completed. As shown in FIG. 14(a), overlap of edges of a recognition model is caused at a part where three-dimensional shapes are overlapped with each other in many cases. In the present invention, if there is any causable intersection to be excluded, the inside and outside in mesh generation cannot be determined in such an overlapped area, and therefore a normal structured mesh cannot be generated. However, it is possible to certainly determine the inside and outside of an edge by excluding the causal intersection in accordance with the present invention, and, therefore, it is possible to generate a desirable structured mesh as shown in FIG. 14(b). In FIG. 14(b), the area Hd hatched with a high density is an area where a mesh has been doubly generated correspondently to overlapped edges. FIG. 14(c) visually more clearly shows an embodiment of an input shape used for the mesh generation process from which FIGS. 14(a) and 14(b) have been obtained.

Figure 15:
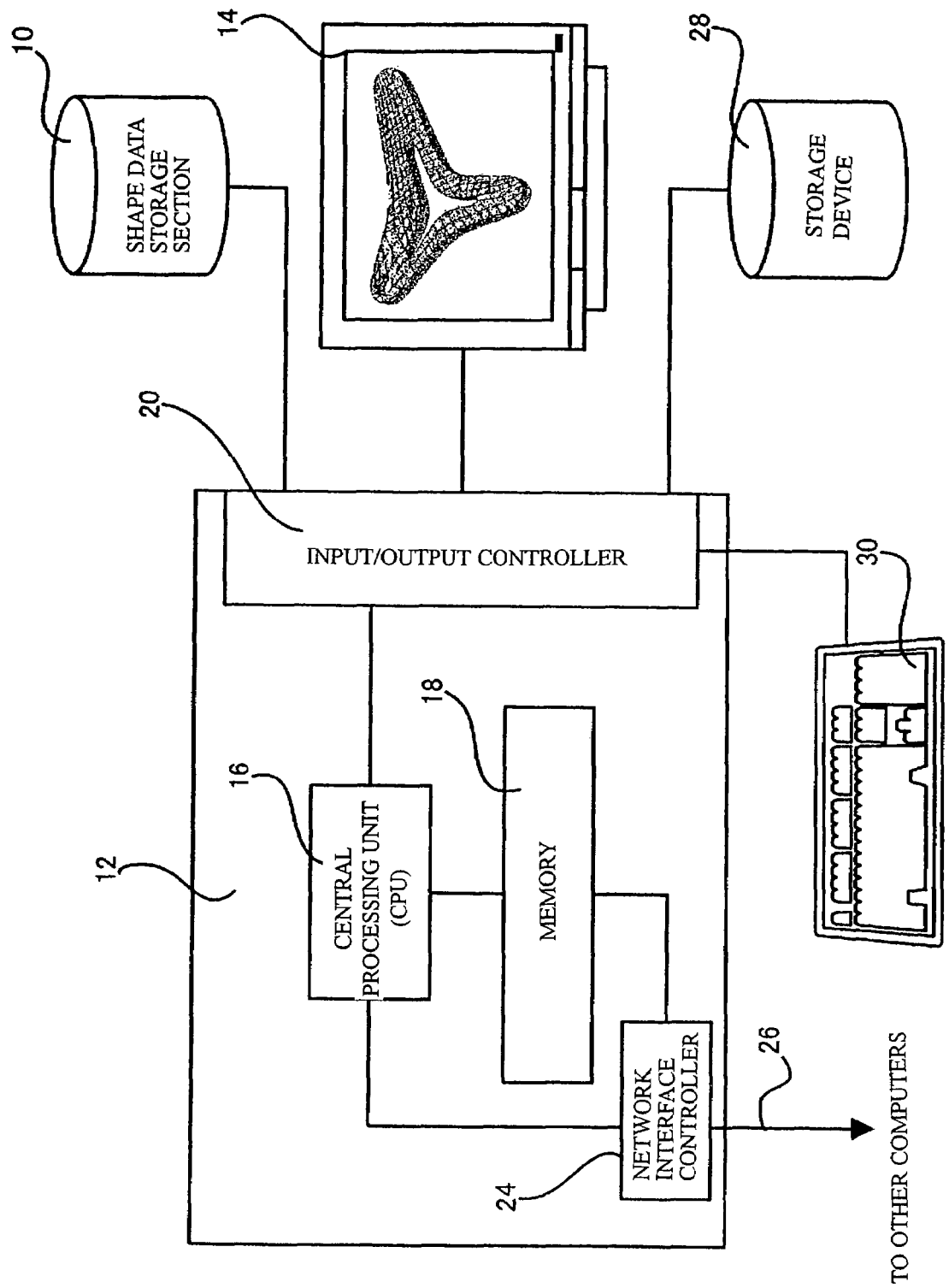
FIG. 15 is a functional block diagram of a structured mesh generation system of the present invention.

FIG. 15 is a functional block diagram of a structured mesh generation system of the present invention. The structured mesh generation system of the present invention shown in FIG. 15 comprises: a shape data storage section 10 for storing shape data generated with vertexes, edges and the like from an input three-dimensional shape; a computer 12 and a display device 14 for visually monitoring a generated structured mesh. In a particular embodiment of the present invention, the shape data storage section 10 is configured as a rewritable storage medium such as a hard disk, a flash memory and an EEPROM. In the shape data storage section 10, there is stored shape data obtained by dividing an input three-dimensional shape generated with a CAD, for example, into vertexes, edges and faces.

The computer 12 is configured as a personal computer, a workstation or a general-purpose computer. The computer 12 is generally configured to include a CPU (central processing unit) 16, a memory 18 such as a random access memory (RAM) and a dynamic random access memory (DRAM), an input/output control section 20 for controlling driving of various external devices such as a hard disk, a flash memory, an EEPROM and a display device. The CPU 16, the memory 18 and the input/output control section 20 of the computer 12 are mutually connected via an internal bus 22 for performing data communication at an appropriate speed. Furthermore, the computer 12 of the present invention may be configured to include a network interface controller (NIC) 24 and connected to other computers via a network 26 to enable processing such as so-called grid computing.

The computer 12 of the present invention comprises various device functions for reading a computer-executable program stored in a storage device 28, such as a hard disk, CD-ROM, MO, flash memory and EEPROM, to execute a structured mesh generation method of the present invention. The computer 12 is also configured to receive input from a user via an input device 30 such as a keyboard.

Figure 16:
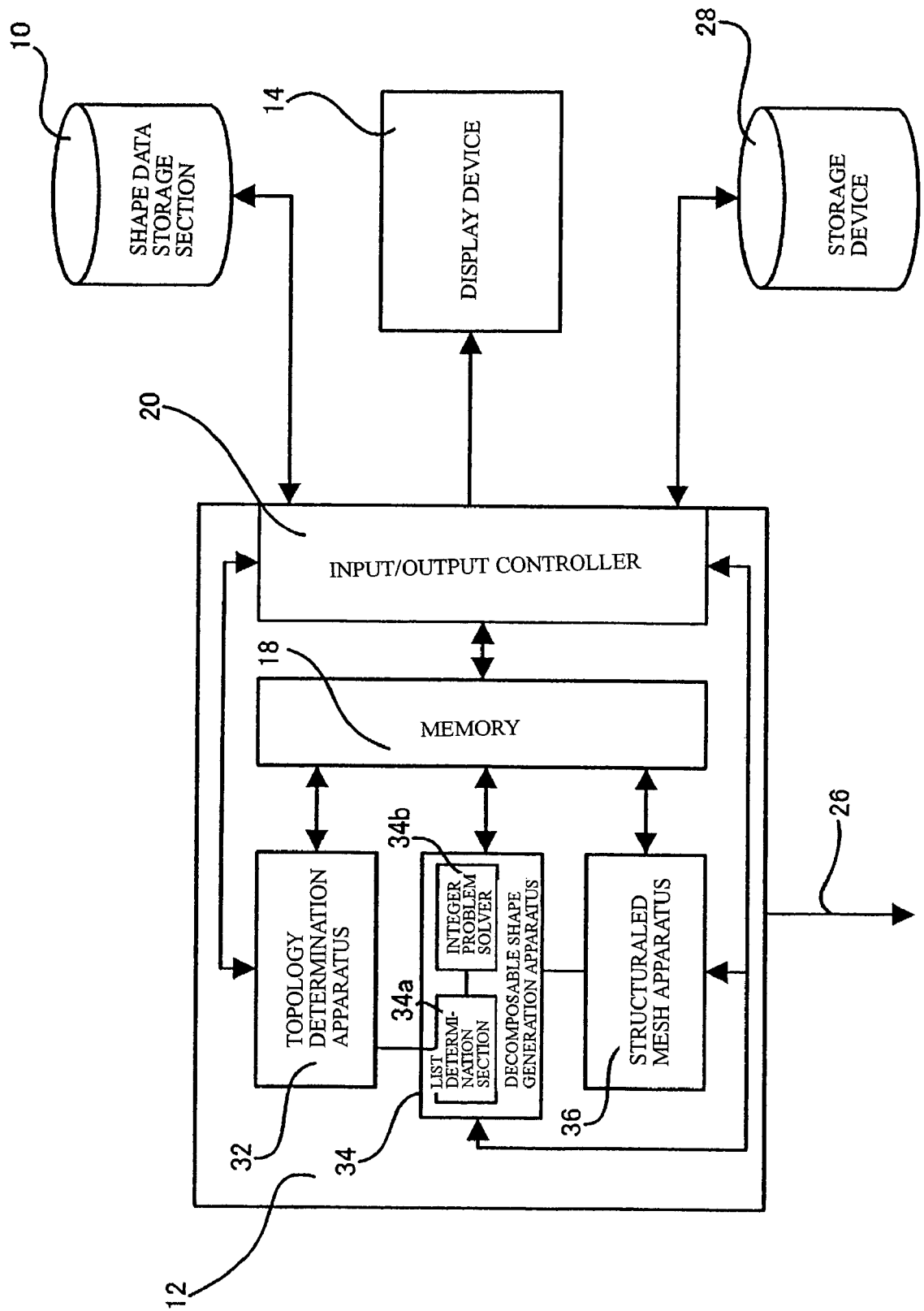
FIG. 16 shows various device functions configured by the computer 12 of the present invention, together with other device functions.
Figure 17:
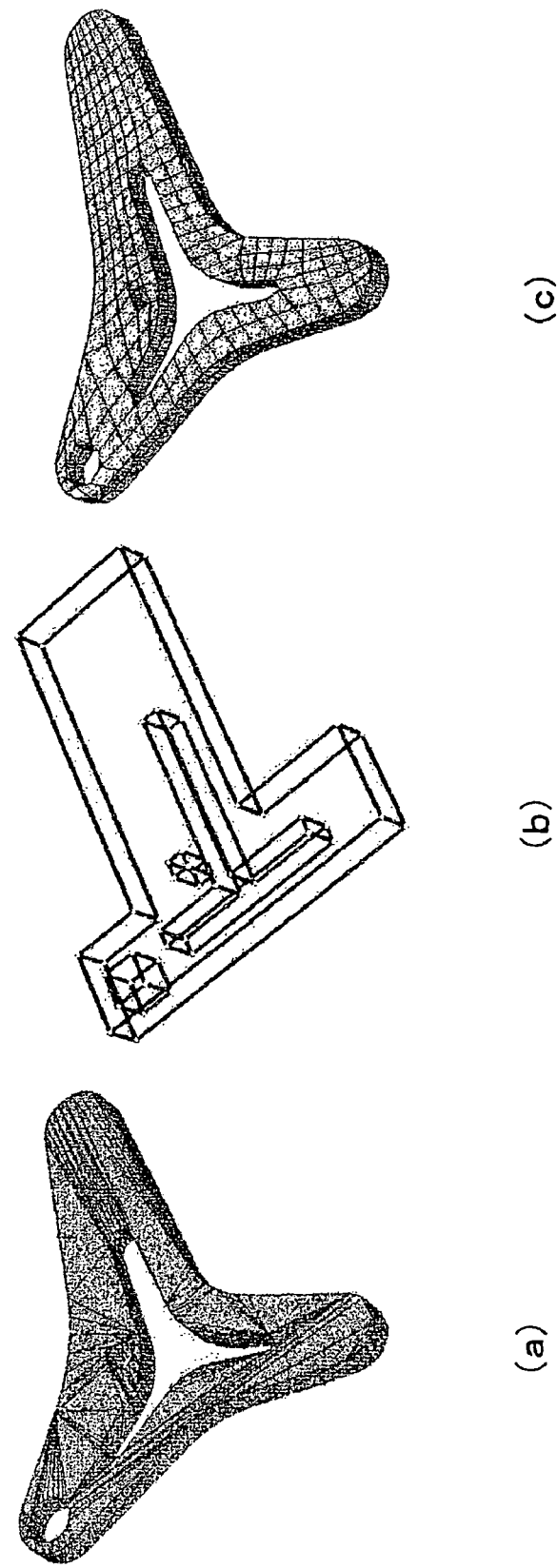
FIG. 17 shows a recognition model (b) and a structured mesh (c) generated from a predetermined input three-dimensional shape (a) with a prior-art method.

FIG. 16 shows the various device functions configured by the computer 12 of the present invention, together with other device functions. Though the storage device 28 is shown as a separate function block different from the shape data storage section 10 in FIG. 16, it may be identical with shape data storage section 10. The device functions generally configured by the computer 12 as software are a topology determination apparatus 32, a decomposable shape generation apparatus 34, and a structured mesh generation apparatus 36.

The topology determination apparatus 32 reads shape data from the shape data storage section 10, executes the causal intersection identifying process and stores a causal intersection list listing intersection pairs which damage topological consistency in the memory 18. The decomposable shape generation apparatus 34 is configured to include a list determination section 34a for reading shape data from the shape data storage section 10 and a causal intersection list from the memory 18 to determine a causal intersection position and an integer problem solver 34b for executing the shape correction process in response to the determination of the list determination section 34a. When values indicating a causal intersection position are detected by the list determination section 34a, the decomposable shape generation apparatus 34 reads an appropriate constraint condition from an appropriate storage area, for example, from an internal memory of the CPU for the integer problem solver 34b. The integer problem solver 34b is then applied to a set of limited vertexes and edges forming the identified causal intersection to calculate an integer programming problem under a predetermined objective function and overwrites corrected shape data, in which the causal intersection has been eliminated, onto the shape data storage section 10 to update the shape data.

In a particular embodiment of the present invention, the structured mesh generation apparatus 36 is configured with software for executing the advancing front method. The structured mesh generation block 36 reads the shape data in which the causal intersection has been eliminated, creates a mesh structure with the advancing front method, completes creation of the mesh when the inside of the shape data is filled with the mesh, and then stores the mesh in the storage device 28 as an output result.

The generated structured mesh data is sent to a display device 14 to be presented to a user as a three-dimensional shape which has been provided with a structured mesh. The user can also provide the generated structured mesh data as input data for software included in the structured mesh generation system as other functions or software enabling stress analysis, fluid mechanics and surface rendering with the use of the finite element method to be performed by another computer through grid computing via the network 26.

Each process and each function block of the present invention are configured as function block means in which a computer-readable program is read by the CPU and functioned by a computer, or as an independent apparatus. The above-described function blocks are not limited to the configuration shown in the figures but can be implemented in a computer in any configuration only if the function of the present invention is achieved as a whole. A computer-executable program for configuring each of the above-mentioned functions in the present invention can be written in various programming languages. Though any known programming language can be used as the programming language, specifically, FORTRAN, C, C++ and Java® can be used in a preferable embodiment of the present invention.

Though the present invention has been described with the use of the particular embodiments shown in the figures, it is not limited to the embodiments shown in the figures. By referring to the embodiments of the present invention shown in the figures, one skilled in the art can easily make various changes, perform exclusion and realize alternative embodiments for the details, components, detailed elements of the embodiments.

As described above, according to the present invention, even when there is included an overlapped part in a shape of a recognition model, it is possible to generate a mesh without performing deformation to exclude all the overlaps, unlike the prior-art methods. By using the present invention, it is possible to generate a mesh with topological consistency, with appropriate scalability even for an input three-dimensional shape having complicatedly overlapped parts.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A topology determination apparatus for determining topological consistency of shape data that provides a spatial graph of an input shape, the apparatus comprising:

a shape data storage device for storing the shape data;

means for reading the shape data from the shape data storage device, calculating positions of intersections of a shape element, generating pairs of the calculated intersection positions to create a causal intersection list and storing the causal intersection list in a memory;

means for selecting an intersection pair from the causal intersection list and determining topological consistency of the shape element between the selected pair of intersections;

means for registering the selected intersection pair as a causal intersection pair, in response to the determination of the topological consistency; and means for causing the causal intersection pair to be identified in the causal intersection list, in response to the registration.

2. A topology determination apparatus according to claim 1, wherein the means for determining topological consistency comprises means for listing the number of intersections that exist in the shape element coupling the selected pair of intersections.

3. A topology determination apparatus according to claim 1, wherein the means for causing the causal intersection pair to be identified in the causal intersection list comprises means for deleting intersection pairs other than the causal intersection pair from the causal intersection list or for inserting an identifier indicating that the causal intersection is a causal intersection pair.

4. A topology determination apparatus according to claim 1, wherein the means for determining topological consistency comprises means for determining the selected intersection pair to be a causal intersection pair with the use of the parity of the number of the intersections.

5. A decomposable shape generation apparatus for determining topological consistency of shape data that provides a spatial graph of an input shape and correcting the shape data so that it can be decomposed, the apparatus comprising:

the topology determination apparatus according to claim 1;

a storage device for storing a constraint condition and an objective function for an integer programming problem;

means for referring to a causal intersection list provided by the topology determination apparatus to a read causal intersection pair;

means for reading shape data from a shape data storage device to specify a shape element that provides the causal intersection pair;

shape correction means for reading the constraint condition for eliminating the intersection of the causal intersection pair form the storage device and numerically calculating the integer programming problem to correct the shape data; and means for updating the shape data including the causal intersection pair with corrected shape data obtained as a result of the numerical calculation and storing the updated shape data.

6. The decomposable shape generation apparatus according to claim 5, wherein the shape correction means comprises means for determining an unprocessed causal intersection pair in the causal intersection list and means for reading updated shape data in response to the determination until there is no unprocessed causal intersection pair.

7. The decomposable shape generation apparatus according to claim 5, wherein the shape element is at least one of: a face; and an edge thereof.

8. The decomposable shape generation apparatus according to claim 5, wherein the shape correction means reads the constraint condition for correction the position of the shape element constituting the specified causal intersection pair from the storage device.

9. A structured mesh generation apparatus, comprising:

the decomposable shape generation apparatus according to claim 5;

means for reading shape data including no causal intersection pair, that is provided by the decomposable shape generation apparatus, from a shape data storage device to generate structured mesh data using a two-dimensional shapes or a polyhedron; and means for storing the generated structured mesh data in a storage device.

10. The structured mesh generation apparatus according to claim 9, wherein the means for generating structured mesh data comprises means for generating mesh data from the outer edge toward the inside of the shape data.

* * * * *